United States Patent
Watanabe

(10) Patent No.: US 8,502,993 B2
(45) Date of Patent: Aug. 6, 2013

(54) PRINT DATA GENERATING APPARATUS

(75) Inventor: Yuuichi Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1132 days.

(21) Appl. No.: 11/505,398

(22) Filed: Aug. 17, 2006

(65) Prior Publication Data

US 2007/0053027 A1    Mar. 8, 2007

(30) Foreign Application Priority Data

Sep. 8, 2005    (JP) ................................ 2005-260006

(51) Int. Cl.
*H04N 1/00*    (2006.01)

(52) U.S. Cl.
USPC ......... 358/1.13; 358/1.15; 358/296; 358/537; 358/402; 709/206; 709/223

(58) Field of Classification Search
USPC ............... 358/1.18, 1.13, 537, 402; 382/311; 709/221, 206; 715/723
See application file for complete search history.

(56) References Cited

U.S. PATENT DOCUMENTS

| | | | | |
|---|---|---|---|---|
| 5,223,939 A | * | 6/1993 | Imaizumi et al. | 358/296 |
| 5,239,622 A | * | 8/1993 | Best et al. | 358/1.18 |
| 5,729,255 A | * | 3/1998 | Aoki | 715/723 |
| 6,898,625 B2 | * | 5/2005 | Henry et al. | 709/206 |
| 6,967,740 B1 | * | 11/2005 | Leng et al. | 358/1.18 |
| 7,268,897 B1 | * | 9/2007 | Moro et al. | 358/1.13 |
| 7,277,192 B2 | * | 10/2007 | Kotani et al. | 358/1.13 |
| 7,379,930 B2 | * | 5/2008 | Kasatani | 707/770 |
| 7,616,337 B2 | * | 11/2009 | Hayashi | 358/1.15 |
| 2002/0025085 A1 | * | 2/2002 | Gustafson et al. | 382/311 |
| 2003/0233437 A1 | * | 12/2003 | Kitada et al. | 709/223 |
| 2004/0059949 A1 | * | 3/2004 | Parry et al. | 713/202 |
| 2004/0143651 A1 | * | 7/2004 | Allen et al. | 709/221 |
| 2005/0273852 A1 | * | 12/2005 | Ferlitsch | 726/17 |

FOREIGN PATENT DOCUMENTS

| | | |
|---|---|---|
| JP | 09-261414 | 10/1997 |
| JP | 2003-008814 | 1/2003 |
| JP | 2005-136898 | 5/2005 |

* cited by examiner

*Primary Examiner* — Steven Kau
*Assistant Examiner* — Ashish K Thomas
(74) *Attorney, Agent, or Firm* — Kubotera & Associates LLC

(57) ABSTRACT

A print data generating apparatus generates print data to be sent to a printing apparatus for printing image data. The print data generating apparatus includes an information storage unit for storing print guarantee area information of the printing apparatus, and an editing unit for editing the image data according to the print guarantee area information stored in the information storage unit. With the configuration, it is possible to generate an image data file according to the printing apparatus and print an image without imperfection.

14 Claims, 20 Drawing Sheets

| 13 Memory | 13a | 13b | |
|---|---|---|---|
| | Printer name storage unit | Print guarantee area storage unit | |
| | | Upper and lower area | Left and right area |
| | Printer A | 250 [mm] | 200 [mm] |
| | Printer B | 248 [mm] | 198 [mm] |

Please input printer name to be registered

Please select printer
    1. Printer A
    2. Printer B

Please input print guarantee area

Lateral size _____ mm
Vertical size _____ mm

FIG. 12 Please input e-mail address

FIG. 13 Please input title of e-mail

Please push printer selection key for non-standard editing
or
Please push start key for standard editing

FIG. 14

Please select printer to be used
1. Printer A
2. Printer B

FIG. 15

```
Example of e-mail contents

Address            ABCDE@abc.com
Title              Test file (C5510MFP)
Attachment file name   Sample (C5510MFP).PDF
```

| Printer name | Sheet | Upper and lower area | Left and right area |
|---|---|---|---|
| Printer X | A4 | 249 | 199 |
| | Letter | 231 | 199 |
| | ⋮ | | |
| Printer A | A4 | 250 | 200 |
| | Letter | 232 | 200 |
| | ⋮ | | |
| ⋮ | | | |

13a / 13c / 13b

PRINT DATA GENERATING APPARATUS

BACKGROUND OF THE INVENTION AND RELATED ART STATEMENT

The present invention relates to a print data generating apparatus for generating print data to be sent to a printing apparatus.

In a conventional system, a computer such as a personal computer (PC) is connected to a scanner and a printer, so that an image read by the scanner is sent to the printer for printing the image. In the conventional system, the PC is used for editing the image read by the scanner according to a command system suitable for basic information such as a sheet size of the printer. After editing the image, print data is sent to the printer, so that the printer performs a printing operation within a specific print area. When a plurality of printers is set to have different print areas, a part of the image may not be printed correctly due to the difference.

FIG. 2 is a view showing a conventional system. As shown in FIG. 2, a PC 102 is connected to a scanner 101 and a printer 103. In the system, the scanner 101 reads an image 105, and sends read data to the PC 102. It is assumed that the image 105 can fit to a frame 106 representing an A-4 size. The PC 102 edits the read data according to a command system suitable for a sheet size of the printer 103 (command editing) It is assumed that the sheet size of the printer 103 is the A-4 size. After the command editing, the PC 102 sends the read data to the printer 103. An A-4 size sheet 106a in the printer 103 has a print guarantee area 107 smaller than the A-4 size. Accordingly, when the printer 103 prints the read data on the A-4 size sheet 106a, an imperfect image 105a is printed on the sheet 106a.

In view of the problems described above, an object of the present invention is to provide a print data generating apparatus for generating print data according to a printing apparatus, so that an image can be printed without imperfection.

Further objects and advantages of the invention will be apparent from the following description of the invention.

SUMMARY OF THE INVENTION

In order to attain the objects described above, according to the present invention, a print data generating apparatus generates print data to be sent to a printing apparatus for printing image data. The print data generating apparatus comprises an information storage unit for storing print guarantee area information of the printing apparatus, and an editing unit for editing the image data according to the print guarantee area information stored in the information storage unit.

With the configuration described above, it is possible to generate an image data file according to the printing apparatus and print an image without imperfection.

BRIEF DESCRIPTION OF THE DRAWINGS

FIG. 12 is a schematic view showing a fourth example of a message displayed on the printer according to the first embodiment of the present invention;

FIG. 13 is a schematic view showing a fifth example of a message displayed on the printer according to the first embodiment of the present invention;

FIG. 14 is a schematic view showing a sixth example of a message displayed on the printer according to the first embodiment of the present invention;

FIG. 15 is a schematic view showing a seventh example of a message displayed on the printer according to the first embodiment of the present invention;

DETAILED DESCRIPTION OF PREFERRED EMBODIMENTS

Figure 3:
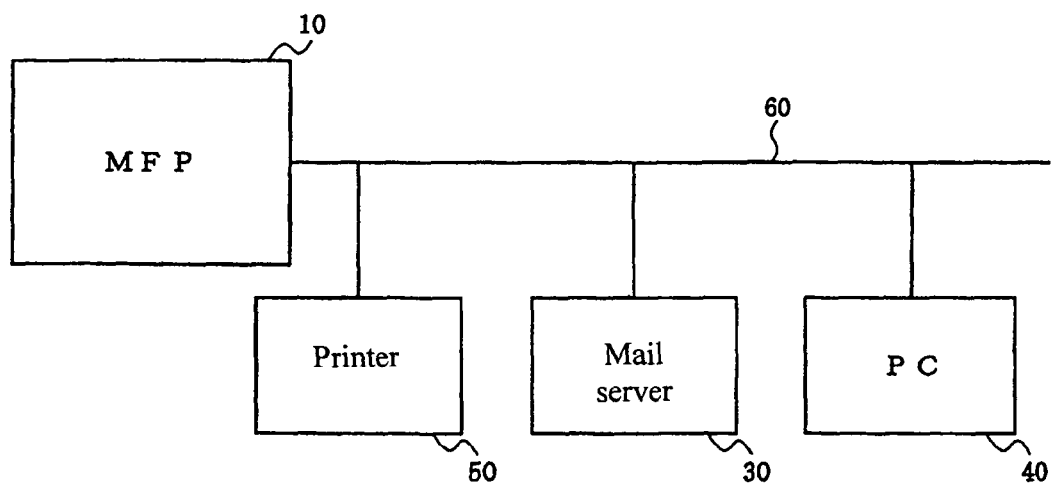
FIG. 3 is a block diagram showing an image printing system according to the first embodiment of the present invention.

Hereunder, embodiments of the present invention will be explained with reference to the accompanying drawings.
First Embodiment FIG. 3 is a block diagram showing an image printing system according to a first embodiment of the present invention. In the image printing system, a print data generating apparatus 10 generates print data, and is formed of a multifunction printer (MFP) having functions of a scanner device, a facsimile device, a printer, and a copier. The MFP 10 is connected through a network 60 to a printer or a printing apparatus 50 for printing image data; a mail server 30 for sending and receiving an e-mail; and a computer such as a personal computer (PC) 40.

In the embodiment, the MFP 10 includes a processing unit such as a CPU and an MPU; a storage unit such as a semiconductor memory; a display unit such as a liquid crystal display and a light emitting diode (LED) display; an input device such as a keyboard, a push button, and a touch panel; and a communication interface.

The printer 50 may be a monochrome printer or a color printer. An image forming method of the printer 50 includes an electro-photography method, an ink-jet method, a wire-dot method, an ink-ribbon method, and a thermal transfer method. The printer 50 includes a processing unit such as a CPU and an MPU; a storage unit such as a semiconductor memory; a display unit such as a liquid crystal display and a light emitting diode (LED) display; an input device such as a keyboard, a push button, and a touch panel; and a communication interface.

The network 60 may be a cable such as a Universal Serial Bus (USB) cable; a network such as an intranet, a local area network (LAN), and a wide area network (WAN); and an Internet protocol network such as Internet.

The PC 40 is a computer having a processing unit such as a CPU and an MPU; a storage unit such as a semiconductor memory; a display unit such as a CRT and a liquid crystal display; an input device such as a keyboard, a push button, and a touch panel; and a communication interface. The mail server 30 is a server as a computer having a processing unit such as a CPU and an MPU; a storage unit such as a semiconductor memory; a display unit such as a CRT and a liquid crystal display; an input device such as a keyboard, a push button, and a touch panel; and a communication interface. The mail server 30 controls an operation of sending and receiving an e-mail.

In the embodiment, the MFP 10 reads an image on an original, and is capable of sending generated print data to the mail server 30 as an attached file of an e-mail through the network 60. The PC 40 sends the print data to the printer 50, and the printer 50 prints image data of the original on a recoding medium such as a sheet. A single printer or a plurality of printers may be connected through the network 60. In the following description, the printer 50 represents any types of printer.

Figure 1:
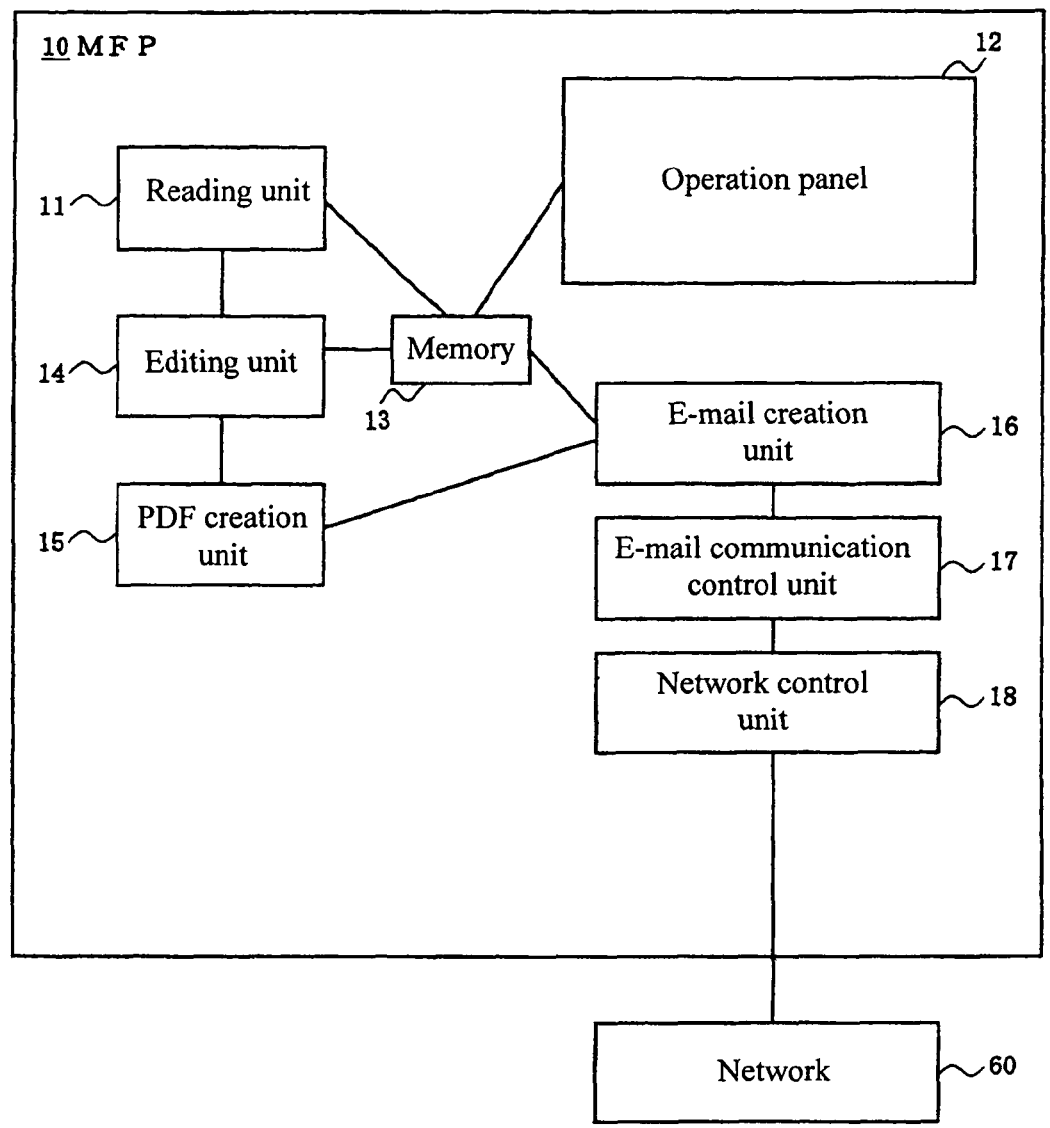
FIG. 1 is a block diagram showing a multifunction printer (MFP) according to a first embodiment of the present invention.
Figure 2:
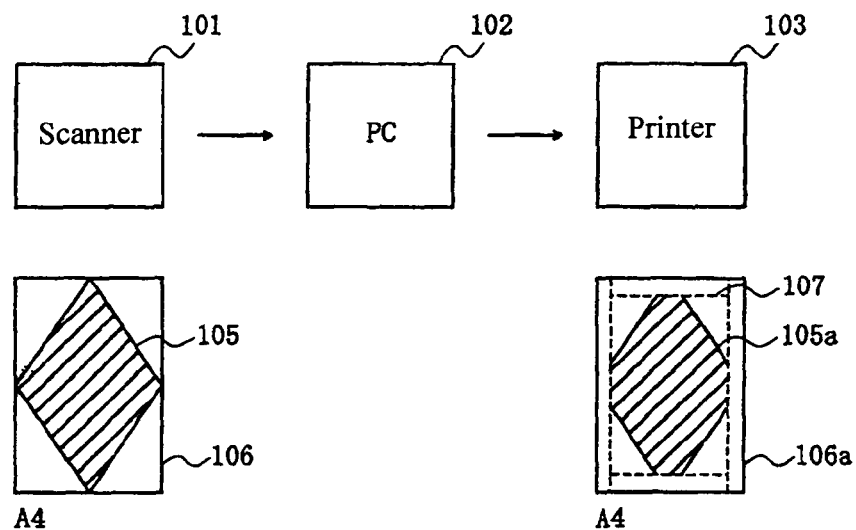
FIG. 2 is a schematic view showing a conventional system.

A configuration of the MFP 10 will be explained next. FIG. 1 is a block diagram showing a multifunction printer (MFP) according to a first embodiment of the present invention. As shown in FIG. 1, the MFP 10 includes a reading unit 11 for reading an original; an editing unit 14 for performing an editing process on image data read in the reading unit 11 according to printable area information or print guarantee area information of the printer 50; an operation panel or operation unit 12 for setting the MFP 10 and operating a copier; a memory or storage unit 13 for storing a printer name, the printable area information, the print guarantee area information, and information for editing the image data; a PDF creation unit 15 for converting the image data to a Portable Document Format (PDF) file as an image data file; an e-mail creation unit 16 for creating an e-mail with the PDF file created in the PDF creation unit 15 as an attachment according to information input through the operation panel 12; an e-mail communication control unit 17 for controlling transfer of an e-mail with Simple Mail Transfer Protocol (SMPT); and a network control unit 18 for controlling the network 60 with Transmission Control Protocol/Internet Protocol (TCPIP).

The printable area is an area where the printer 50 is physically able to print, and is determined by a width of a photosensitive drum, a width of an LED head of an exposure unit, and so on. The print guarantee area is an area where it is possible to maintain certain print quality within the printable area. In some cases, the printable area is the same as the print guarantee area. In most cases, however, the print guarantee area is smaller than the printable area.

The reading unit 11 is provided with an imaging element such as Charge Coupled Device (CCD) and an imaging tube; a lens; and a lump for irradiating a medium with an image printed thereon such as a sheet or an original such as a photograph. The reading unit 11 scans an image on an original to read the same.

Figures 4, 5:
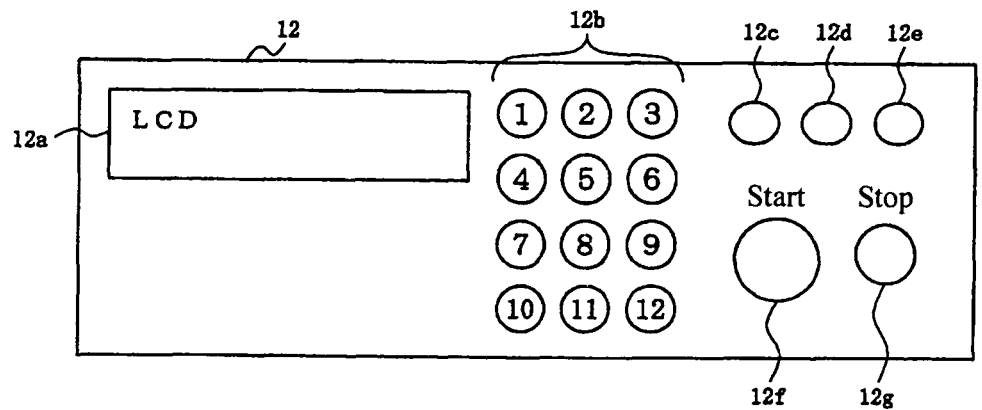
FIG. 4 is a schematic view showing an operation panel according to the first embodiment of the present invention.
FIG. 5 is a block diagram showing a memory according to the first embodiment of the present invention.

The operation panel 12 will be explained next. FIG. 4 is a schematic view showing the operation panel 12 according to the first embodiment of the present invention. In the embodiment, the print guarantee area is set through the operation panel 12, and it is possible to set the printable area through a similar process.

As shown in FIG. 4, the operation panel 12 includes a liquid crystal display (LCD) or display unit 12a; an input keypad or input unit 12b for inputting letters such as numbers and alphabets; a printer registration unit 12c for registering a printer name; a print guarantee area registration unit 12d for registering a print guarantee area per a printer registered in the printer registration unit 12c; a printer selection unit 12e for selecting a printer so that image data is edited in a print area thereof; a start key 12f for starting reading and entering registration; and a stop key 12g for stopping reading and canceling registration.

A configuration of the memory 13 will be explained next. FIG. 5 is a block diagram showing the memory 13 according to the first embodiment of the present invention.

Figure 7:
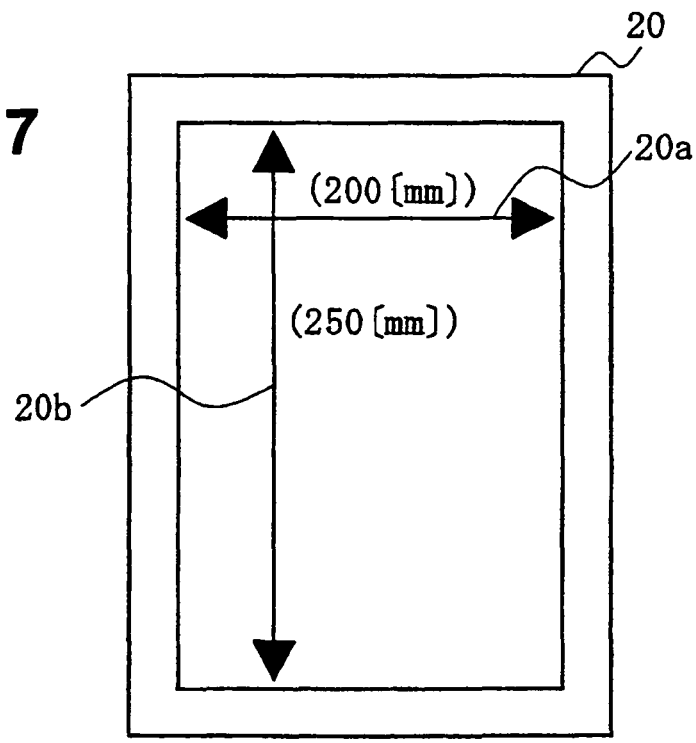
FIG. 7 is a schematic view showing a print guarantee area of a print sheet according to the first embodiment of the present invention.

As shown in FIG. 5, the memory 13 includes a printer name storage unit 13a for storing the printer name input through the operation panel 12; and a print guarantee area storage unit 13b for storing the print guarantee area. The print guarantee area storage unit 13b is capable of storing an upper and lower print guarantee area and a left and right print guarantee area, respectively. The upper and lower print guarantee area and the left and right print guarantee area show a vertical width and a lateral width of the print guarantee area, respectively (FIG. 7). The printer name storage unit 13a and the print guarantee area storage unit 13b are capable of storing information of a plurality of printers. In an example shown in FIG. 5, information of a printer A and a printer B is stored. In the embodiment, the print guarantee area corresponding to an A-4 size sheet is stored, and the print guarantee areas of various types of sheets can be stored.

An operation of the image printing system will be explained next. First, a process of registering the printer name and the print guarantee area through the operation panel 12 will be explained.

Figure 6:
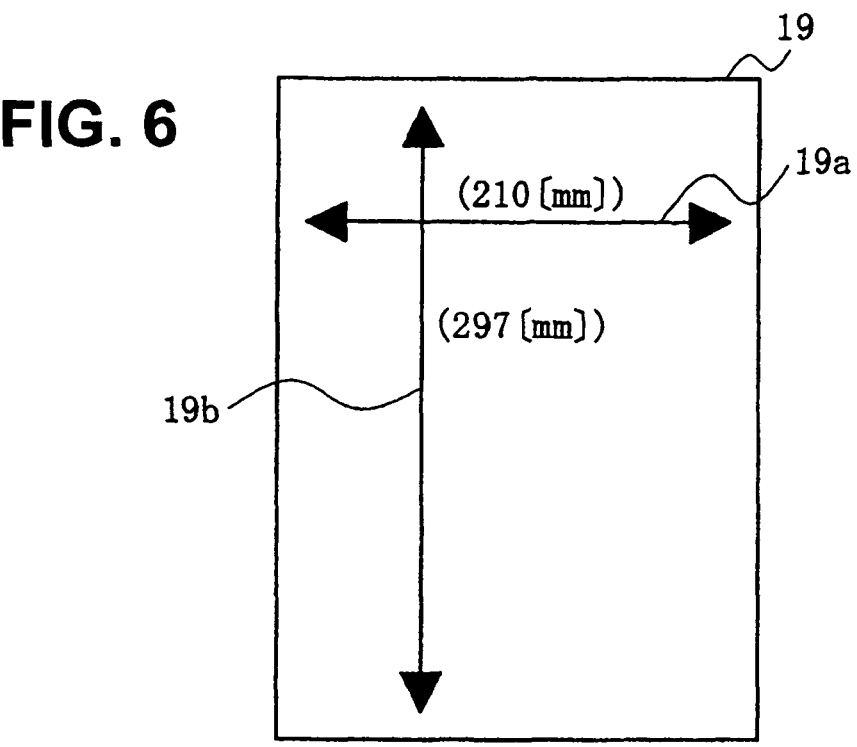
FIG. 6 is a schematic view showing an original sheet to be read according to the first embodiment of the present invention.
Figures 8, 9, 10:
FIG. 8 is a schematic view showing a first example of a message displayed on an operation panel according to the first embodiment of the present invention.
FIG. 9 is a schematic view showing a second example of a message displayed on the operation panel according to the first embodiment of the present invention.
FIG. 10 is a schematic view showing a third example of a message displayed on the operation panel according to the first embodiment of the present invention.
Figure 11:
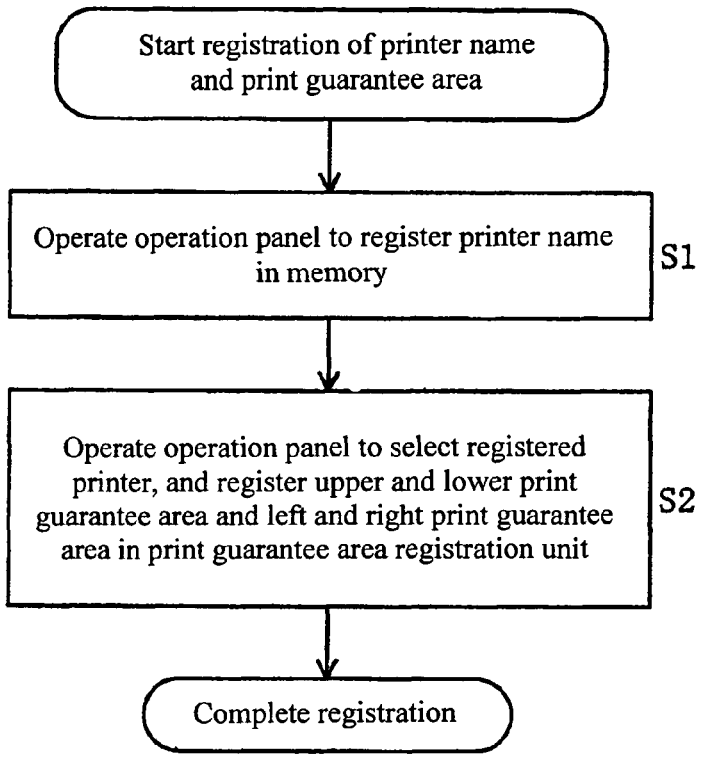
FIG. 11 is a flow chart showing a process of registering a printer name and a print guarantee area according to the first embodiment of the present invention.

FIG. 6 is a schematic view showing the original sheet to be read according to the first embodiment of the present invention. FIG. 7 is a schematic view showing the print guarantee area of a print sheet according to the first embodiment of the present invention. FIG. 8 is a schematic view showing a first example of a message displayed on the operation panel according to the first embodiment of the present invention. FIG. 9 is a schematic view showing a second example of a message displayed on the operation panel according to the first embodiment of the present invention. FIG. 10 is a schematic view showing a third example of a message displayed on the operation panel according to the first embodiment of the present invention. FIG. 11 is a flow chart showing the process of registering the printer name and the print guarantee area according to the first embodiment of the present invention.

In the operation, first, an operator operates the printer registration unit 12c of the operation panel 12 to start registering the printer name. As shown in FIG. 8, the message of "Please input printer name to be registered" is displayed on the LCD 12a. When the operator inputs the printer name through the input keypad 12b and pushes the start key 12f, the input printer name is registered and stored in the printer name storage unit 13a of the memory 13. In the embodiment, the printer A is input as the printer name, and the printer name is stored in the printer name storage unit 13a as shown in FIG. 5.

As shown in FIG. 9, when the operator starts operating the print guarantee area registration unit 12d, a message of "Please select printer" and the printer names registered are displayed on the LCD 12a. In the embodiment, the printer A and the printer B are registered. When the printer A is selected, a message of "Please input print guarantee area" is displayed as shown in FIG. 10. The operator operates the input keypad 12b to register the upper and lower print guarantee area and the left and right print guarantee area of the printer A. The input contents are registered in the print guarantee area storage unit 13b of the memory 13.

In general, the print guarantee area is related to the printable area, and is physically limited. Further, limitation of the print guarantee area depends on a printer. As shown in FIG. 6, an original 19 has a left and right reading area 19a and an upper and lower reading area 19b. As shown in FIG. 7, a print sheet 20 has the left and right print guarantee area 20a and the upper and lower print guarantee area 20b. As shown in FIGS. 6 and 7, the left and right reading area 19a is larger than the left and right print guarantee area 20a, and the upper and lower reading area 19b is larger than the upper and lower print guarantee area 20a. Accordingly, when the print sheet 20 is printed, the image is missing in differences in the left and right print guarantee area 20a and the upper and lower print guarantee area 20b.

To solve the problem, the print guarantee area of the printer A is set as specified in specifications and catalog. As shown in FIG. 5, when the original 19 has the A4 size, the printer A is selected, and the left and right print guarantee area and the upper and lower print guarantee area are set at 200 mm and 250 mm, respectively.

With reference to FIG. 11, the flow chart of the process of registering the printer name and the print guarantee area will be explained next. In step S1, the operator operates the printer registration unit 12c to register the printer name in the printer name storage unit 13a of the memory 13. In step S2, the operator selects the registered printer, and operates the print guarantee area registration unit 12d to register the upper and lower print guarantee area and the left and right print guarantee area, thereby completing the process.

A process of sending the print data from the MFP 10 to the mail server 30 through an e-mail will be explained next.

Figure 16:
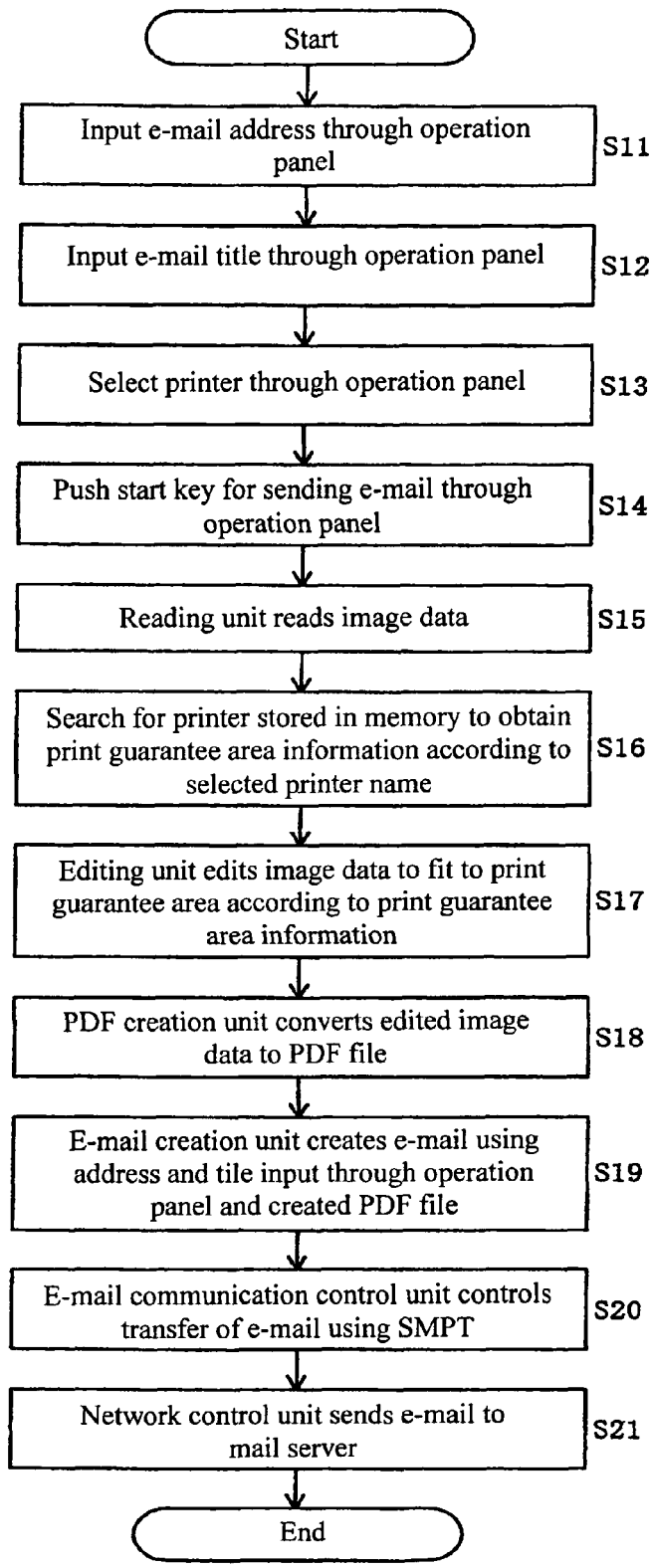
FIG. 16 is a flow chart showing a process of sending print data through an e-mail according to the first embodiment of the present invention.

FIG. 12 is a schematic view showing a fourth example of a message displayed on the printer according to the first embodiment of the present invention. FIG. 13 is a schematic view showing a fifth example of a message displayed on the printer according to the first embodiment of the present invention. FIG. 14 is a schematic view showing a sixth example of a message displayed on the printer according to the first embodiment of the present invention. FIG. 15 is a schematic view showing a seventh example of a message displayed on the printer according to the first embodiment of the present invention. FIG. 16 is a flow chart showing a process of sending print data through an e-mail according to the first embodiment of the present invention.

First, as shown in FIG. 12, a message of "Please input e-mail address" is displayed on the LCD 12a of the operation panel 12 of the MFP 10 for inputting an e-mail address. The operator operates the input keypad 12b to input an e-mail address. As shown in FIG. 13, a message of "Please input title of e-mail" is displayed on the LCD 12a for inputting a title of the e-mail. The operator operates the input keypad 12b to input a title of the e-mail.

As shown in FIG. 14, a message of "Please push printer selection key for non-standard editing" is displayed on the LCD 12a. That is, the message prompts the operator to select whether a normal PDF file is created or editing for the printer 50 is performed. As shown in FIG. 15, when the operator pushes the printer selection unit 12e of the operation panel 12, a message of "Please select printer to be used" and the printer names registered as apparatus identification information of the printer 50 are displayed on the LCD 12a. The operator selects the printer to be used. When the operator makes no selection and pushes the start key 12f, the standard PDF file is created without editing the image data.

When the operator pushes the start key 12f to start sending the e-mail, the reading unit 11 starts reading the image, and the image is stored in the memory 13. According to the printer name selected by the operator, the printer 50 is searched from the printer names stored in the printer name storage unit 13a of the memory 13, so that the print guarantee area information corresponding to the printer 50 is obtained from the print guarantee area storage unit 13b.

In the next step, the editing unit 14 edits the image data stored in the memory 13 according to the print guarantee area information, so that the image data is converted to have a size for the print guarantee area. For example, as shown in FIG. 6, the original 19 has 210 mm of the left and right reading area 19a and 297 mm of the upper and lower reading area 19b. When the printer A is selected as shown in FIG. 5, the print sheet 20 has 200 mm of the left and right print guarantee area 20a and 250 mm of the upper and lower print guarantee area 20b as shown in FIG. 7. Accordingly, the editing unit 14 performs a process of reducing the print data to fit to the print guarantee area. In the reduction process, for example, the whole image is reduced at 250/297 ratio, or a vertical length thereof is reduced at 250/297 ratio and a lateral length thereof is reduced at 20/21 ratio. Then, the PDF creation unit 15 converts the edited image data to the PDF file.

In the next step, the e-mail creation unit 16 creates an e-mail having the address and the tile input through the operation panel 12, and an attachment of the PDF file created in the PDF creation unit 15. Then, the e-mail communication control unit 17 controls transfer of the e-mail using SMPT used for transmitting a standard e-mail. Further, the network control unit 18 controls the network 60 according to TCPIP for standard network communication to send the e-mail to the mail server 30.

With reference to FIG. 16, the flow chart of the process of sending print data through the e-mail according to the first embodiment of the present invention will be explained next.

In step S11, the operator operates the input keypad 12*b* of the operation panel 12 to input the e-mail address. In step S12, the operator operates the input keypad 12*b* of the operation panel 12 to input the title of the e-mail. In step S13, the operator operates the input keypad 12*b* of the operation panel 12 to select the printer 50. In step S14, the operator operates the input keypad 12*b* of the operation panel 12 to push the start key 12*f* for sending the e-mail.

In step S15, the reading unit 11 reads the image data. In step S16, according to the printer name selected by the operator, the printer 50 is searched from the printer names stored in the printer name storage unit 13*a* of the memory 13, so that the print guarantee area information corresponding to the printer 50 is obtained. In step S17, the editing unit 14 edits the image data stored in the memory 13 according to the print guarantee area information, so that the image data is converted to have a size corresponding to the print guarantee area. In step S18, the PDF creation unit 15 converts the edited image data to the PDF file.

In step S19, the e-mail creation unit 16 creates the e-mail having the address and the tile input through the operation panel 12, and the attachment of the PDF file created in the PDF creation unit 15. In step S20, the e-mail communication control unit 17 controls transfer of the e-mail using SMPT. In step S21, the network control unit 18 sends the e-mail to the mail server 30, thereby completing the process.

In the embodiment, the MFP 10 or the print data generation apparatus includes the memory 13 for storing the print guarantee area information of the printer 50 and the editing unit 14 for editing the image data according to the print guarantee area information stored in the memory 13. Accordingly, it is possible to create the PDF file suitable for the printer 50. As a result, when the printer 50 performs a printing operation, it is possible to print an image without imperfection.

In the embodiment, the printer 50 is separated from the MFP 10, and the printer 50 may be combined with the MFP 10. That is, when the image data is scanned and the printing operation, not the e-mail transfer, is directed, the editing process is performed according to the print guarantee area information corresponding to the printer 50 in the MFP 10. The print guarantee area information corresponding to the printer 50 in the MFP 10 is stored in the print guarantee area information storage unit in the MFP 10.

Figures 28, 29:
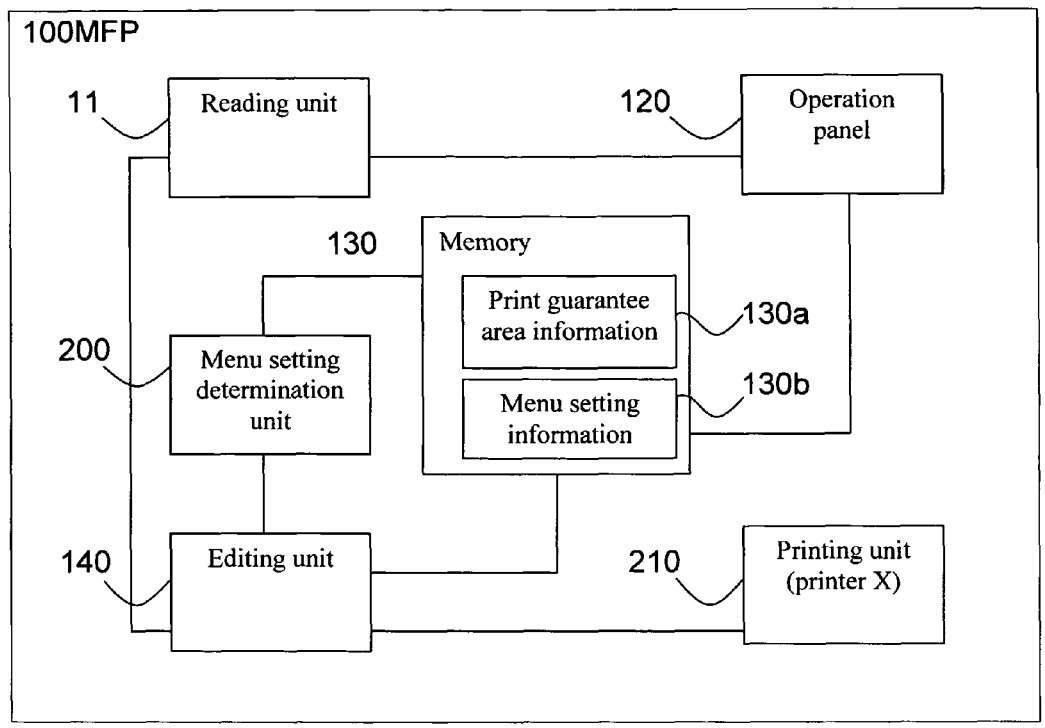
FIG. 28 is a block diagram showing a multifunction printer (MFP) according to a modified example of the first embodiment of the present invention.
FIG. 29 is a schematic view showing a printable area information table stored in a memory according to the modified example of the first embodiment of the present invention.

The configuration described above is applied to a modified example of the first embodiment of the present invention. FIG. 28 is a block diagram showing a multifunction printer (MFP) 100 according to the modified example of the first embodiment of the present invention.

In the embodiment, the MFP 100 includes an operation panel or operation unit 120 having a switch and a display; the reading unit 11 for reading an original; a memory 130 for storing printable area information 130*a* and menu setting information 130*b*; a menu setting determination unit 200 for determining a menu setting; an editing unit 140 for editing image data; and a printing unit (printer X) 210 for printing the image data sent from the editing unit 140.

The operation panel 120 includes an input unit for demanding a copy and inputting command information of the operator such as a setting of apparatus menu; and a display unit having a display for displaying apparatus status information and apparatus menu contents. The reading unit 11 reads an original placed on an original table (not shown) with a scanner to create the image data. The memory 130 stores the printable area information 130*a* and the print guarantee area information 130*b* per a printer and a sheet size. The menu setting determination unit 200 reads a setting value of a size adjustment menu stored in the menu setting information 130*b* of the memory 130, and determines whether the setting is valid.

When the menu setting determination unit 200 determines that the size adjustment menu is set to be valid for adjustment, the editing unit 140 reads the print guarantee area information of the printer X 210 in the MFP 100 paired with the sheet size corresponding to the original size. Then, the editing unit 140 edits the image data according to the print guarantee area. When the menu setting determination unit 200 determines that the size adjustment menu is set to be invalid for adjustment, the editing unit 140 does not edit the image data sent from the reading unit 11, and sends the same to the printing unit 210 as is. The printing unit 210 converts the image data sent from the editing unit 140 to printable bit map data, and sends the bit map data to a printer engine to print the image data on a sheet stored in the MFP 100.

FIG. 29 is a schematic view showing the printable area information table 130*a* stored in the memory 130 according to the modified example of the first embodiment of the present invention. The printer X 210 is installed in the MFP 100. As a default setting of the MFP 100, only information of the printer X 210 is registered in the printable area information table 130*a*. The printable area information corresponding to various sheet sizes is stored per a printer. The information of the printer A is registered by the operator as described in the first embodiment, or through communication with the printer A.

Figure 31:
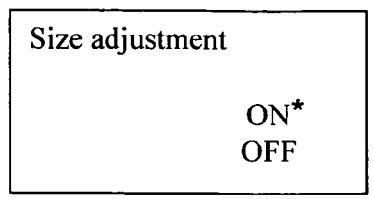
FIG. 31 is a schematic view showing a display of a size adjustment menu according to the modified example of the first embodiment of the present invention.

FIG. 31 is a schematic view showing a display of the size adjustment menu according to the modified example of the first embodiment of the present invention. As shown in FIG. 31, the size adjustment menu is set to be valid (ON).

Figure 30:
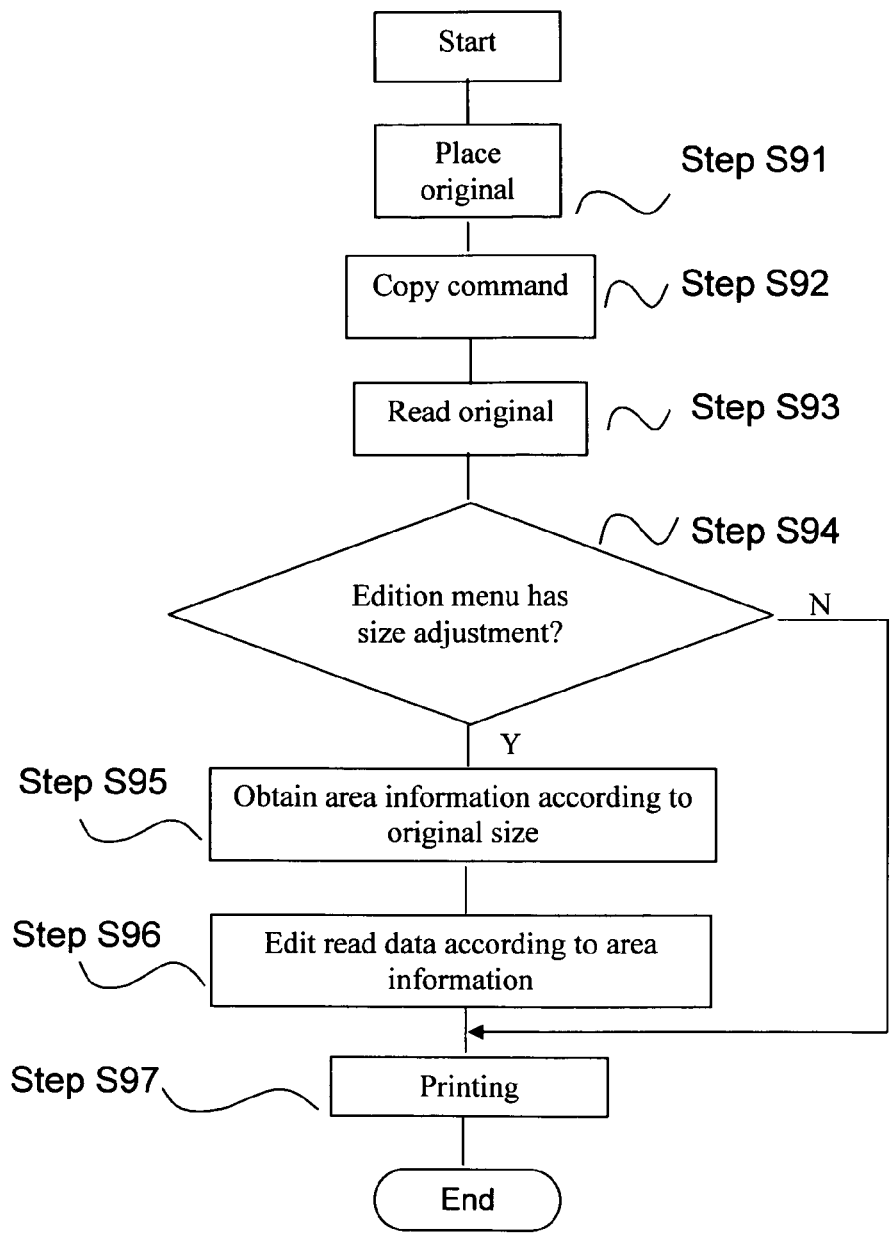
FIG. 30 is a flow chart showing a copy operation of the multifunction printer (MFP) according to the modified example of the first embodiment of the present invention.

FIG. 30 is a flow chart showing a copy operation of the multifunction printer (MFP) according to the modified example of the first embodiment of the present invention. In step S91, the operator places an original to be copied on an original table (not shown) of the MFP 100. In step S92, the operator pushes a copy switch on the operation panel 120. In step S93, according to the copy command, the MFP 100 scans the original on the original table to create the image data. In step S94, the menu setting determination unit 200 reads the setting value corresponding to the size adjustment menu contents stored in the menu setting information 130*b* of the memory 130, and determines whether the size adjustment menu is set to be valid.

In step S95, when the menu setting determination unit 200 determines that the size adjustment menu is set to be valid, the editing unit 140 reads the printable area information 130*a* in the memory 130. In this case, the printer X 21*b* is selected to perform the copy operation. Accordingly, the editing unit 140 reads the printable area information corresponding to the printer X 210 in the MFP 100. Further, the sheet size to be printed is selected according to the original size, and the printable area information corresponding to the sheet size is obtained.

In step S96, the editing unit 140 edits the image data sent from the reading unit 11 according to the printable area information, so that the image data fits to the printable area. In step S97, when the size adjustment menu is set to be valid, the image data edited according to the printable area is sent to the printing unit 210. When the size adjustment menu is set to be invalid, the image data generated in the reading unit 11 is sent to the printing unit 210 as is. Upon receiving the image data, the printing unit 210 prints the image data.

In the embodiment, it is determined whether the size adjustment menu is set to be valid according to the apparatus menu. Alternatively, a size of print sheet is determined according to a size of an original, and a size of the printable area in the determined print sheet size is obtained. Afterward, a size of the read image is compared with the obtained printable area size. The apparatus automatically determines so that the read data is edited when the read image size is larger than the obtained printable area size, and the read data is not edited when the read image size is smaller than the obtained printable area size. Similar to the first embodiment, it is applicable to a case in which the printer X is selected as the printer.

Second Embodiment

A second embodiment of the present invention will be explained next. Components similar to those in the first embodiment are designated by the same reference numerals, and explanations thereof are omitted. Further, explanations of operations and effects similar to those in the first embodiment are omitted as well.

Figure 17:
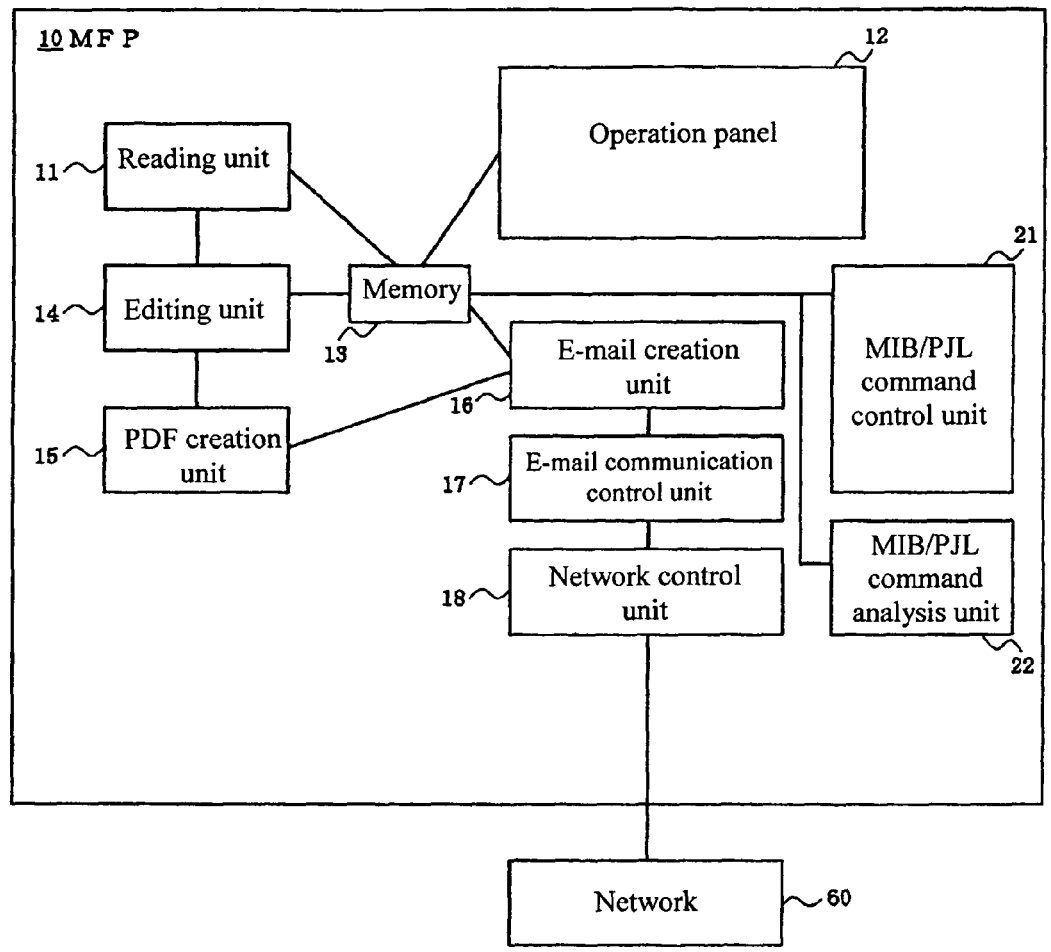
FIG. 17 is a block diagram showing a multifunction printer (MFP) according to a second embodiment of the present invention.

FIG. 17 is a block diagram showing a multifunction printer (MFP) according to the second embodiment of the present invention.

As shown in FIG. 17, the MFP 10 includes an MIB/PJL command control unit 21 for generating Management Information Base (MIB) to recognize the printer 50 on the network 60, and for generating a Printer Job Language (PJL) command to request the printer 50 to return the print guarantee area information; and an MIB/PJL command analysis unit 22 for analyzing the MIB and the PJL command returned from the printer 50. Other configurations are the same as that in the first embodiment, and the explanations thereof are omitted.

Figure 18:
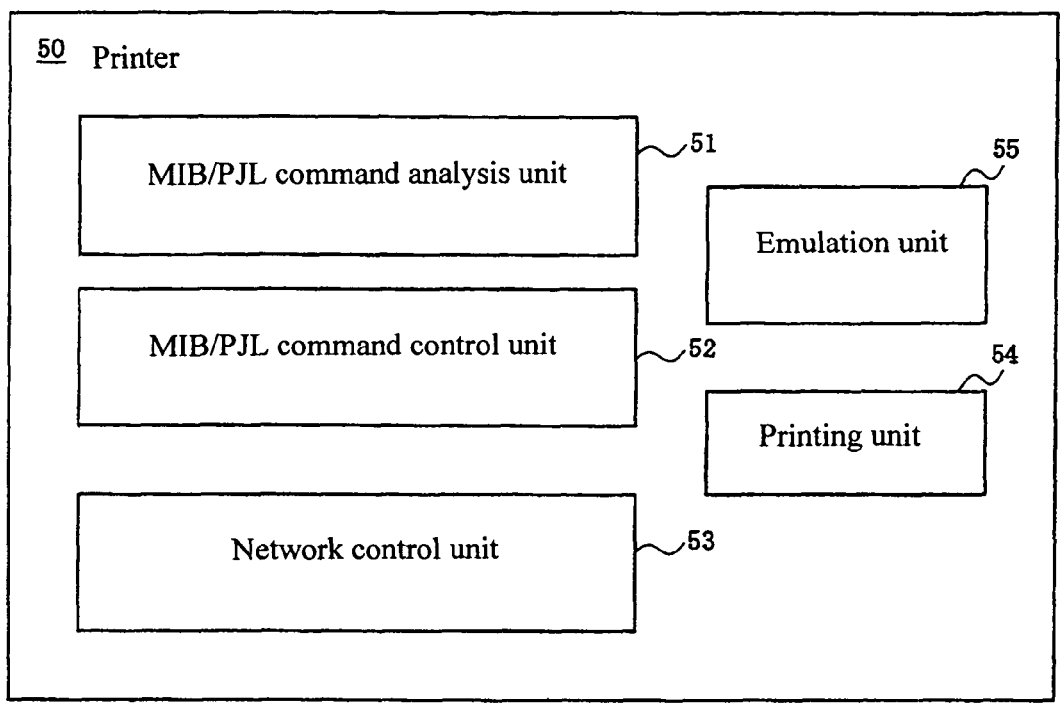
FIG. 18 is a block diagram showing a printer according to the second embodiment of the present invention.

A configuration of the printer 50 according to the second embodiment of the present invention will be explained next. FIG. 18 is a block diagram showing the printer 50 according to the second embodiment of the present invention.

As shown in FIG. 18, the printer 50 includes an MIB/PJL command analysis unit 51 for analyzing the MIB and the PJL command returned from the network 60; an MIB/PJL command control unit 52 for creating the printer name as a response to the MIB when an analyzed result of the MIB/PJL command analysis unit 51 is an inquiry of the printer name as identification information, and for creating the print guarantee area as a response to the PJL command when an analyzed result of the MIB/PJL command analysis unit 51 is the PJL command requesting for the print guarantee area information; a network control unit 53 for controlling communication of the network 60; an emulation unit 55 for interpreting a computer language; and a printing unit 54 for controlling a printing operation.

Figure 19:
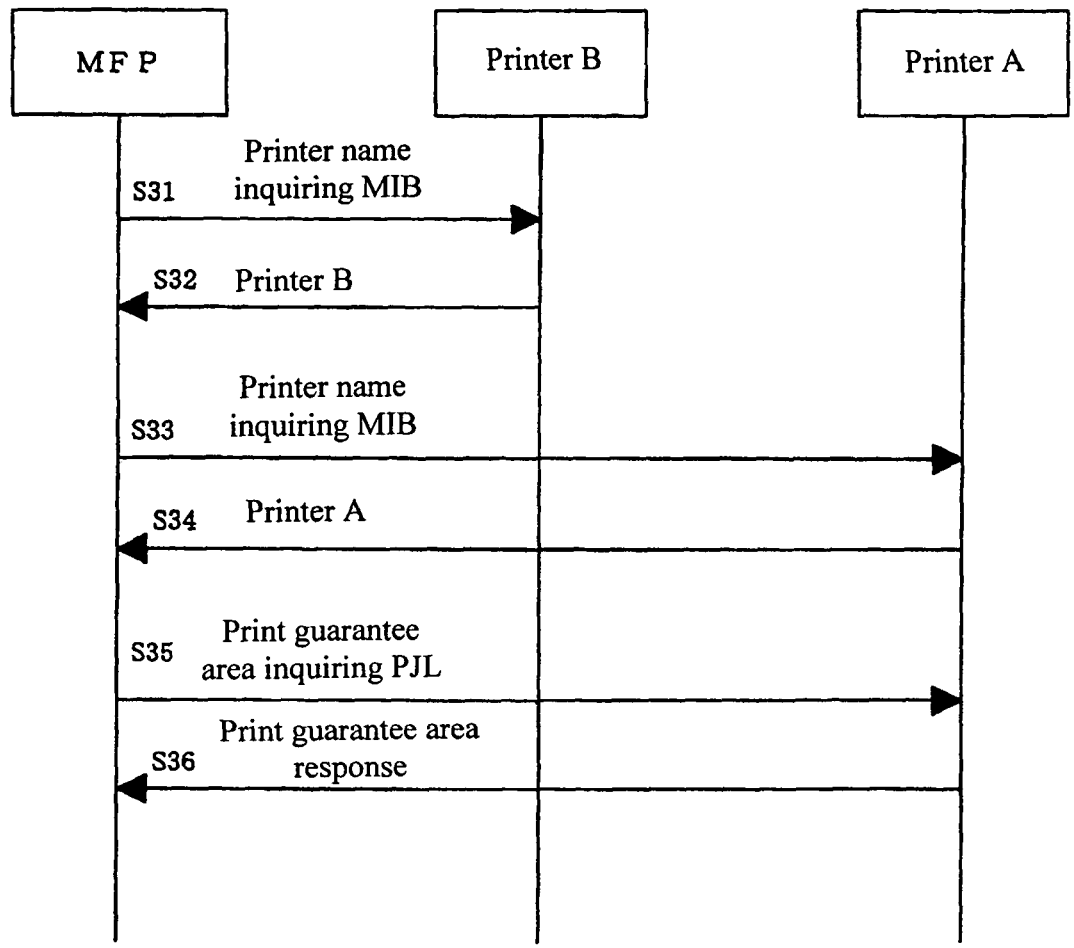
FIG. 19 is a block diagram showing a sequence of an image printing system according to the second embodiment of the present invention.
Figure 20:
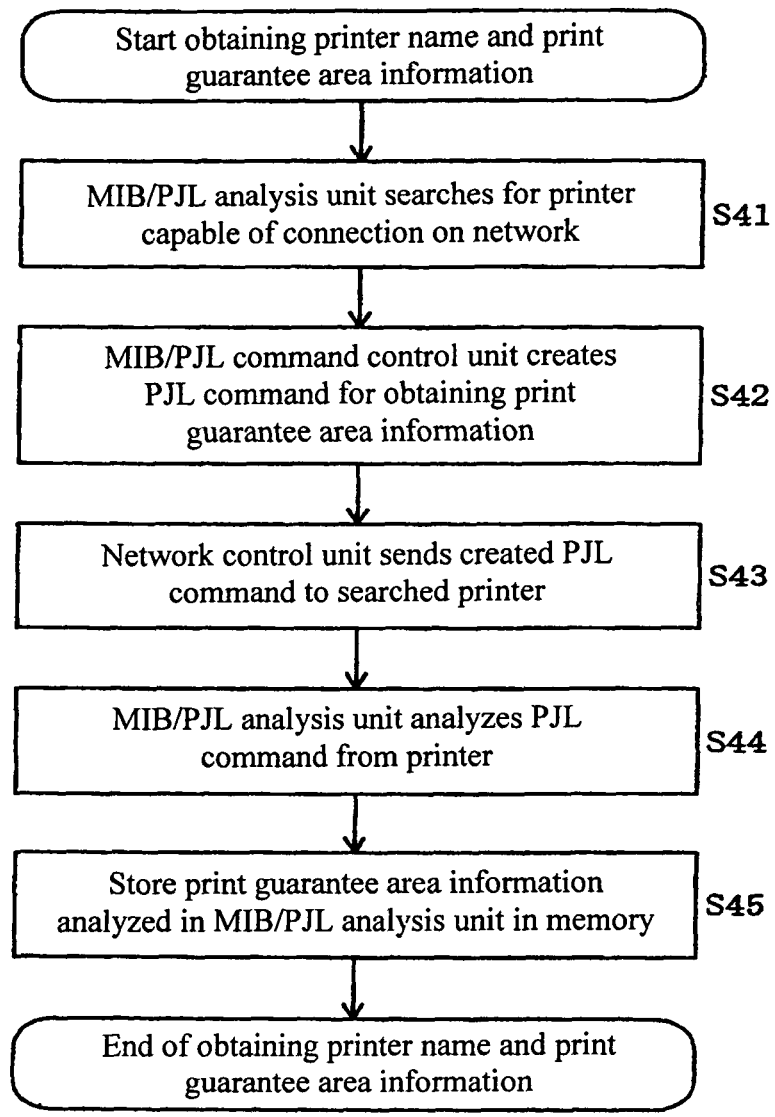
FIG. 20 is a flow chart showing an operation of the image printing system according to the second embodiment of the present invention.

An operation of the image printing system according to the second embodiment of the present invention will be explained next. FIG. 19 is a block diagram showing a sequence of the image printing system according to the second embodiment of the present invention. FIG. 20 is a flow chart showing the operation of the image printing system according to the second embodiment of the present invention.

As described above, in the first embodiment, the operator operates the input keypad 12b of the operation panel 12 to register the information in the printer name storage unit 13a and the print guarantee area storage unit 13b of the memory 13. On the other hand, in the second embodiment, the information is obtained through communication with the printer 50 connected to the network 60, and the information is registered in the printer name storage unit 13a and the print guarantee area storage unit 13b of the memory 13. That is, each printer holds the print guarantee area information.

First, the MIB/PJL command analysis unit 22 of the MFP 10 creates the MIB command for searching for the printer 50 capable of connection on the network 60. Then, the network control unit 18 broadcasts the MIB command on the network 60, and the MIB/PJL command analysis unit 22 analyzes the response to conduct the search of the printer 50. When the MIB command is sent to the printer responding to the broadcast, for example, as shown in FIG. 19, when the MFP 10 sends the MIB command to the printer A and the printer B on the network 60, the MFP 10 sends the MIB inquiring the printer name to the printer B, and the MFP 10 receives the printer name from the printer B. At the same time, the MFP 10 sends the MIB inquiring the printer name to the printer A, and the MFP 10 receives the printer name from the printer A.

When the printer 50 capable of connection is found, the MIB/PJL command control unit 21 creates the PJL command for obtaining the print guarantee area information, and the network control unit 18 sends the PJL command to the printer 50.

It is assumed that the printer B does not support the PJL, and the printer A supports the PJL. Further, it is assumed that the MFP 10 is capable of determining whether a printer supports the PJL through recognizing a printer name thereof. Alternatively, the MFP 10 may inquire of each printer for capability thereof. After receiving the printer name of the printer A in response to the MIB, the MFP 10 sends the PJL inquiring the print guarantee area to the printer A, and the MFP 10 receives a response regarding the left and right print guarantee area 20a and the upper and lower print guarantee area 20b from the printer A.

Then, the MIB/PJL command analysis unit 22 of the MFP 10 analyzes the PJL response command including the print guarantee area information received from the printer A, so that the printer name is stored in the printer name storage unit 13a and the print guarantee area information is stored in the print guarantee area storage unit 13b. Other operations are the same as those in the first embodiment, and explanations thereof are omitted.

The sequence shown in FIG. 19 will be explained next. In step S31, the MFP 10 sends the MIB inquiring the printer name to the printer B. In step S32, the MFP 10 receives the printer name from the printer B. In step S33, the MFP 10 sends the MIB inquiring the printer name to the printer A. In step S34, the MFP 10 receives the printer name from the printer A. In step S35, the MFP 10 sends the PJL inquiring the print guarantee area to the printer A. In step S36, the MFP 10 receives the response regarding the left and right print guarantee area 20a and the upper and lower print guarantee area 20b from the printer A.

The flow chart shown in FIG. 20 will be explained next. In step S41, the MIB/PJL command analysis unit 22 of the MFP 10 searches for the printer 50 capable of connection on the network 60. In step S42, the MIB/PJL command control unit 21 of the MFP 10 creates the PJL for obtaining the print guarantee area information. In step S43, the network control unit 18 sends the PJL response command to the printer 50 searched. In step S44, the MIB/PJL command analysis unit 22 analyzes the PJL response command including the print guarantee area information received from the printer. In step S45, the print guarantee area information is stored in the print guarantee area storage unit 13b of the memory 13, thereby completing the process.

As described above, in the second embodiment, the apparatus identification information of the printer 50 capable of connection and the print guarantee area information corresponding to the printer 50 are obtained through the communication between the MFP 10 and the printer 50 using the specific commands. The obtained information is stored in the memory 13. Accordingly, it is not necessary for the operator to input the apparatus identification information and the print guarantee area information of the printer 50 through the operation panel 12, thereby improving operability. Other effects are the same as those in the first embodiment.

Third Embodiment

A third embodiment will be explained next. Components similar to those in the first and second embodiments are designated by the same reference numerals, and explanations thereof are omitted. Further, explanations of operations and effects similar to those in the first and second embodiments are omitted as well.

Figures 21, 22:
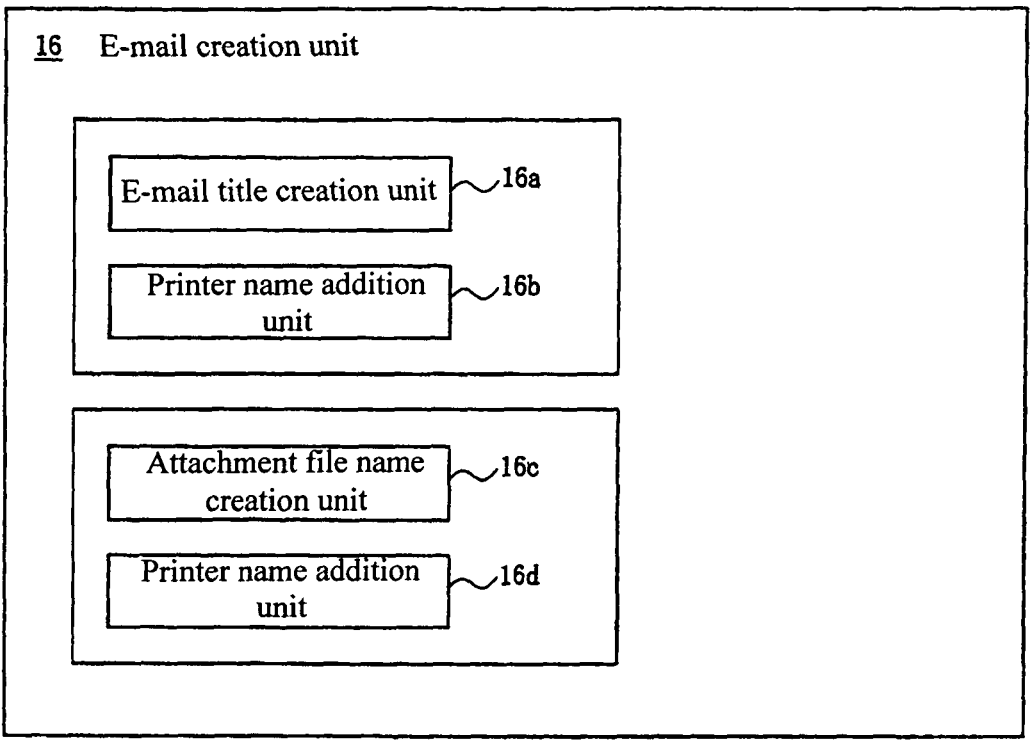
FIG. 21 is a block diagram showing an e-mail creation unit according to a third embodiment of the present invention.
FIG. 22 is a schematic view showing an example of an e-mail generated in the e-mail creation unit according to the third embodiment of the present invention.

FIG. 21 is a block diagram showing an e-mail creation unit according to the third embodiment of the present invention.

As shown in FIG. 21, the e-mail creation unit 16 of the MFP 10 includes an e-mail title creation unit 16a for creating a title of an e-mail according to information input through the operation panel 12; a printer name addition unit 16b for adding a printer name to the title of the e-mail created according to information input through the operation panel 12; an attachment file name creation unit 16c for creating a name of an attachment of the e-mail according to information input through the operation panel 12; and a printer name addition unit 16d for creating an attachment file name in which a printer name of the printer 50 selected as apparatus identification information is added to the title of the e-mail created according to information input through the operation panel 12. Other configurations are same as those in the first embodiment, and explanations thereof are omitted.

Figure 23:
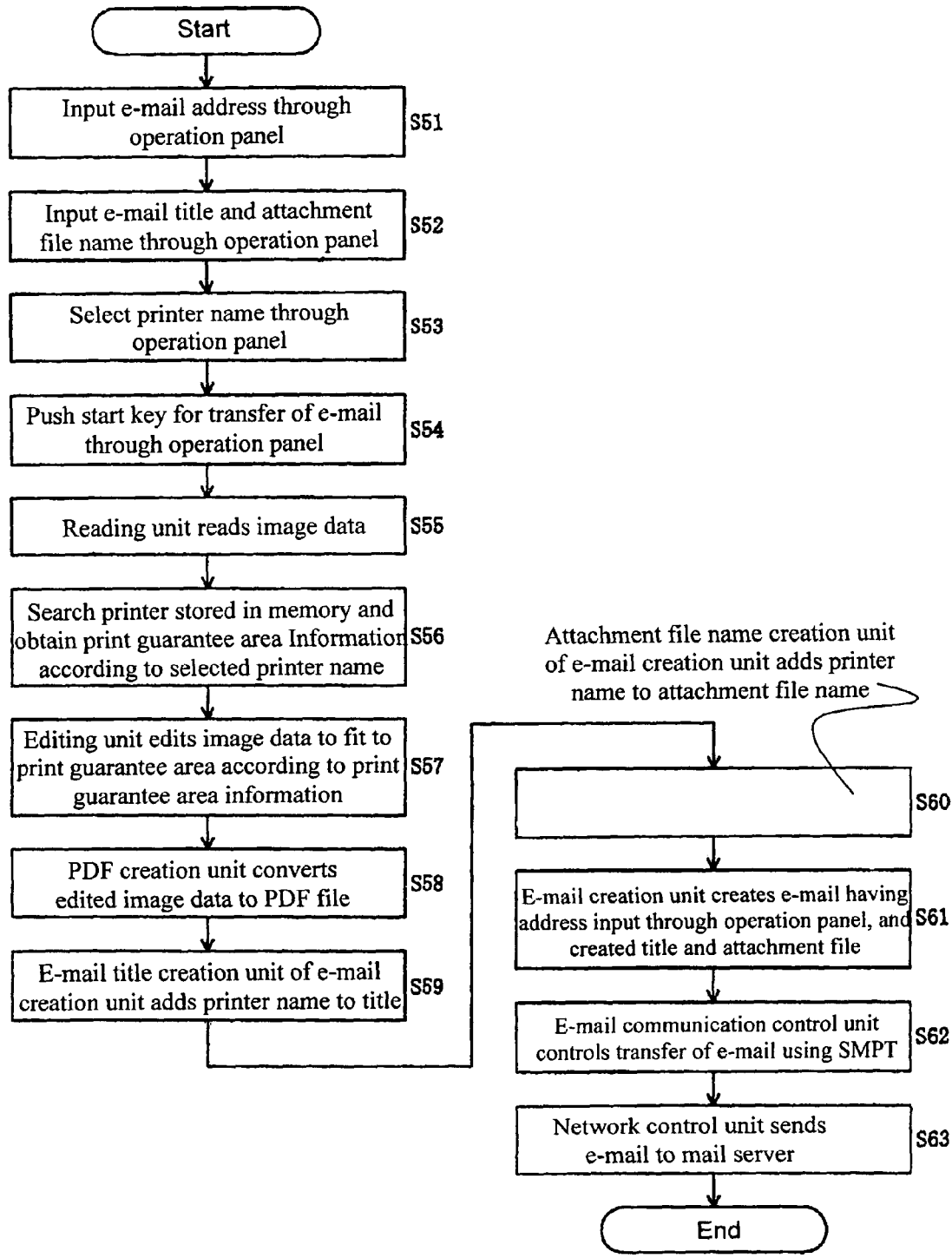
FIG. 23 is a flow chart showing a process of sending print data to a mail server through an e-mail according to the third embodiment of the present invention.

An operation of the image printing system according to the third embodiment will be explained next. FIG. 22 is a schematic view showing an example of the e-mail generated in the e-mail creation unit according to the third embodiment of the present invention. FIG. 23 is a flow chart showing a process of sending the print data to the mail server through the e-mail according to the third embodiment of the present invention.

First, the operator operates the operation panel 12 to input an e-mail address, a title of the e-mail, and a name of an attachment file. Next, the operator operates the operation panel 12 to select the printer name and start sending the e-mail. As a result, the reading unit 11 reads an image, and the image data is stored in the memory 13. According to the printer name selected, the printer name is searched among the printer names stored in the printer name storage unit 13a of the memory 13, and the corresponding print guarantee area information is obtained from the print guarantee area information storage unit 13b.

According to the print guarantee area information, the editing unit 14 edits the image data stored in the memory 13, so that the image data fits to the print guarantee area. Then, the PDF creation unit 15 converts the edited image data to the PDF file. The e-mail title creation unit 16a of the e-mail creation unit 16 creates the title of the e-mail according to the information input through the operation panel 12. The printer name addition unit 16b adds the printer name selected through the operation panel 12 to the title.

The attachment file name creation unit 16c of the e-mail creation unit 16 creates the name of the attachment file of the e-mail according to information input through the operation panel 12. The printer name addition unit 16d creates the attachment file name in which the selected printer name is added to the attachment file name input through the operation panel 12. The e-mail creation unit 16 creates the e-mail according to the address input through the operation panel 12, the title, and the attachment file.

The e-mail communication control unit 17 controls the transfer of the e-mail using SMPT. The network control unit 18 controlling the network 60 using standard TCPIP used for network communication, so that the e-mail is sent to the mail server 30.

The e-mail creation unit 16 creates the e-mail having the contents shown in FIG. 22. In the example shown in FIG. 22, the title is selected as "Test file", the attachment file name is selected as "Sample", and the printer name is selected as "C5510MFP" through the operation panel 12, respectively. In this case, the title is "Test file (C5510MFP)", and the attachment file name is "Sample (C5510MFP)". Accordingly, it is possible for the operator receiving the e-mail to recognize that the print data belongs to which printer.

The flow chart shown in FIG. 23 will be explained next. In step S51, the e-mail address is input through the operation panel 12. In step S52, the title of the e-mail and the attachment file name are input through the operation panel 12. In step S53, the printer name is selected through the operation panel 12. In step S54, the start key 12f is pushed through the operation panel 12 for transfer of the e-mail. In step S55, the reading unit 11 reads the image data. In step S56, according to the printer name selected, the printer 50 is searched among the printer names stored in the printer name storage unit 13a of the memory 13, and the print guarantee area information corresponding to the printer 50 is obtained.

In step S57, the editing unit 14 edits the image data stored in the memory 13 according to the print guarantee area information, so that the image data fits to the print guarantee area. In step S58, the PDF creation unit 15 converts the edited image data to the PDF file. In step S59, the e-mail title creation unit 16a of the e-mail creation unit 16 creates the title of the e-mail according to the information input through the operation panel 12, and the printer name addition unit 16b adds the printer name selected through the operation panel 12 to the title.

In step S60, the attachment file name creation unit 16c of the e-mail creation unit 16 creates the name of the attachment file of the e-mail according to the information input through the operation panel 12. The printer name addition unit 16d creates the attachment file name in which the selected printer name is added to the attachment file name input through the operation panel 12. In step S61, the e-mail creation unit 16 creates the e-mail having the address and the title input through the operation panel 12, and the attachment file created in the PDF creation unit 15. In step S62, the e-mail communication control unit 17 controls the transfer of the e-mail using SMPT. In step S63, the network control unit 18 sends the e-mail to the mail server 30, thereby completing the process.

As described above, in the third embodiment, through the operation of the operation panel 12 of the MFP 10 as the print data generating apparatus, the apparatus identification information of the printer 50 is added to the attachment file name and the title of the e-mail. Accordingly, the operator can visually determine which printer is suitable for printing the attachment file, thereby improving operability. The printer name may be inserted in a main text of the e-mail.

Fourth Embodiment

A fourth embodiment of the present invention will be explained next. Components similar to those in the first to third embodiments are designated by the same reference numerals, and explanations thereof are omitted. Further, explanations of operations and effects similar to those in the first to third embodiments are omitted as well.

Figure 24:
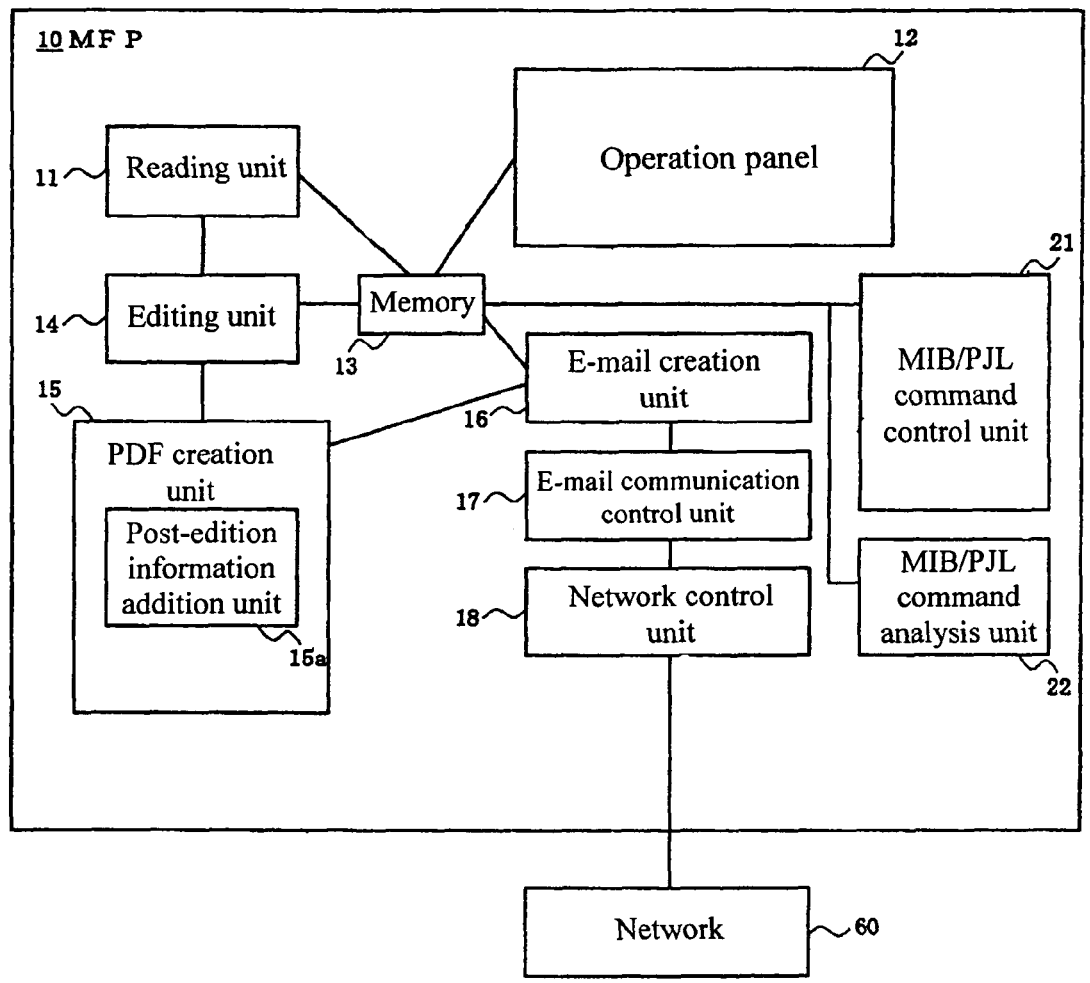
FIG. 24 is a block diagram showing a multifunction printer (MFP) according to a fourth embodiment of the present invention.

FIG. 24 is a block diagram showing a multifunction printer (MFP) according to the fourth embodiment of the present invention. As shown in FIG. 24, the PDF creation unit 15 of the MFP 10 includes a post-edition information addition unit 15a for adding information indicating that the editing unit 14 has already edited the image data to a header portion of the PDF file. Other configurations are same as those in the second embodiment, and explanations thereof are omitted.

Figure 25:
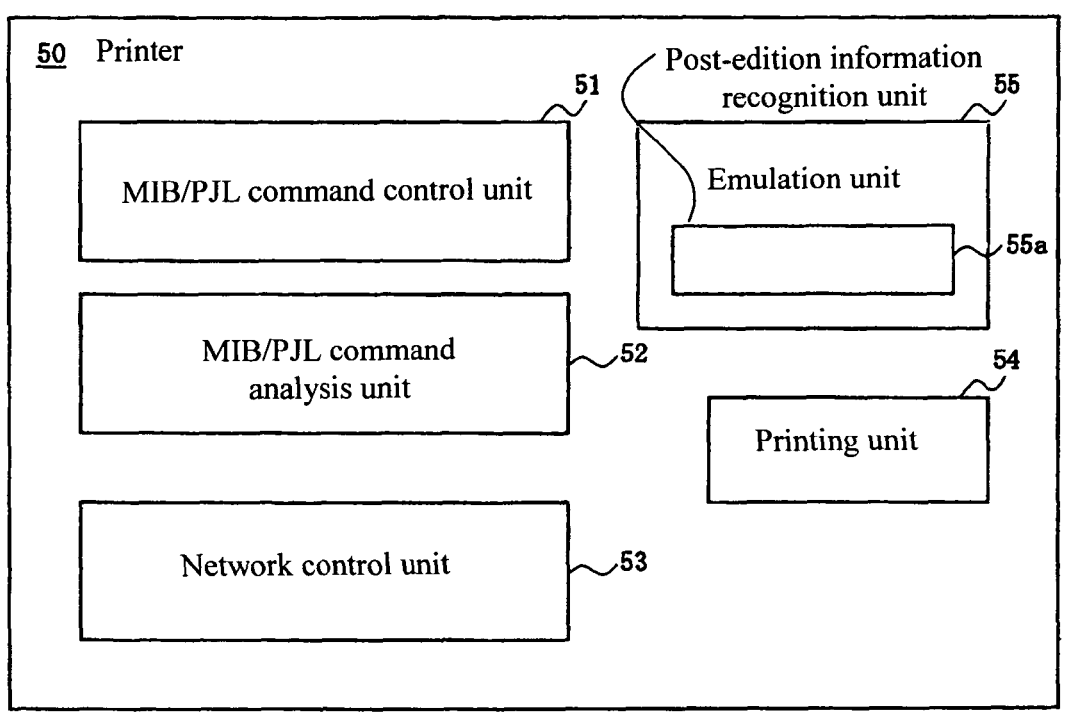
FIG. 25 is a block diagram showing a printer according to the fourth embodiment of the present invention.

A configuration of the printer 50 will be explained next. FIG. 25 is a block diagram showing the printer according to the fourth embodiment of the present invention. As shown in FIG. 25, the emulation unit 55 of the printer 50 includes a post-edition information recognition unit 55a for finding the port-edition information from the header portion of the PDF file. Other configurations are same as those in the second embodiment, and explanations thereof are omitted.

Figure 26:
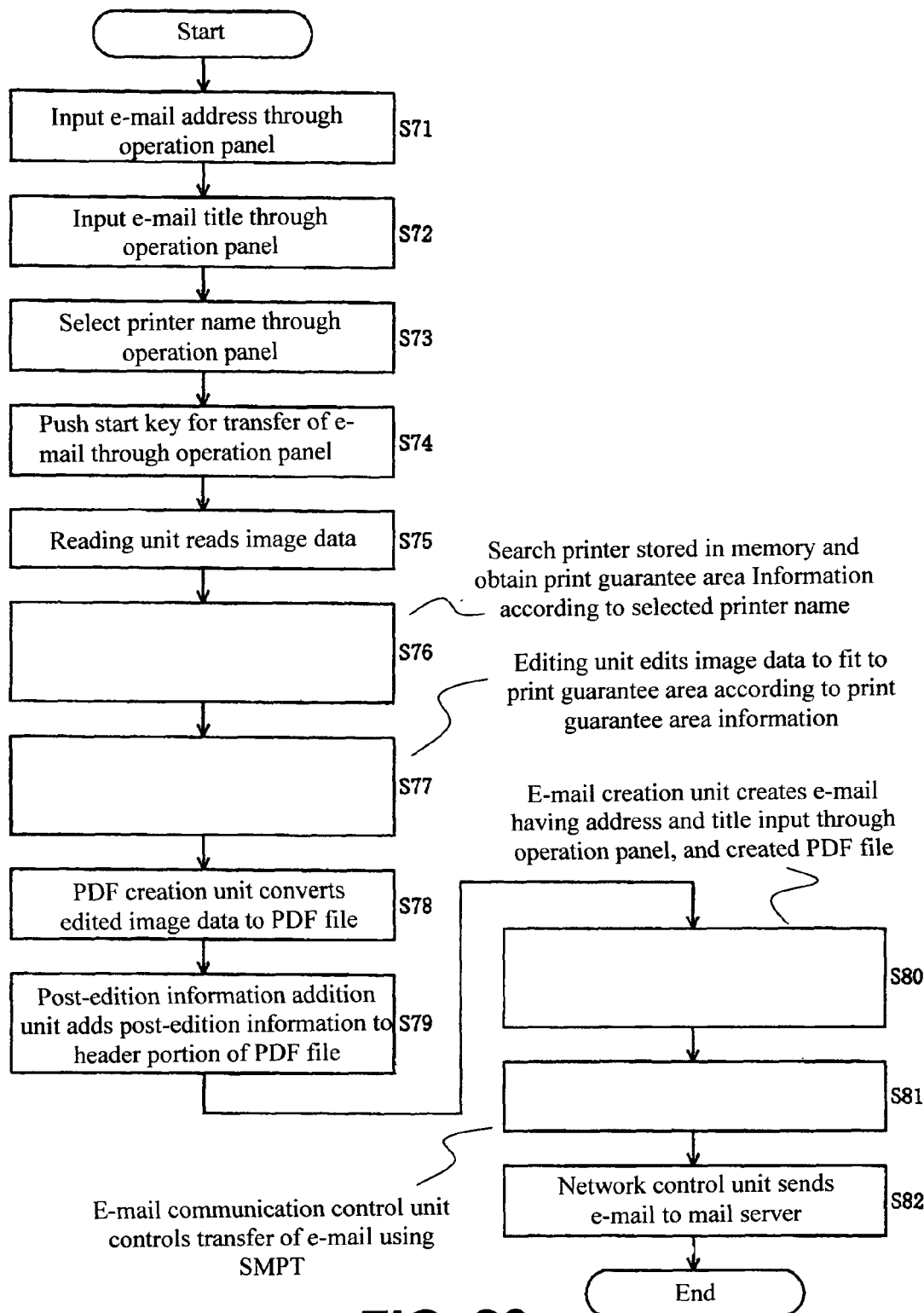
FIG. 26 is a flow chart showing a process of sending print data to a mail server through an e-mail according to the fourth embodiment of the present invention.

An operation of the image printing system according to the fourth embodiment of the present invention will be explained next. FIG. 26 is a flow chart showing a process of sending the print data to the mail server through the e-mail according to the fourth embodiment of the present invention. The process from reading the image to editing and converting the image data to the PDF file is the same as that in the first embodiment, and explanation thereof is omitted.

In the fourth embodiment, after the PDF creation unit 15 converts the image data edited in the editing unit 14 to the PDF file, the post-edition information addition unit 15a adds the information indicating post-edition to the header portion of the PDF file. The following process is the same as that in the first embodiment, and explanation thereof is omitted.

The flow chart shown in FIG. 26 will be explained next. In step S71, the e-mail address is input through the operation panel 12. In step S72, the title of the e-mail is input through the operation panel 12. In step S73, the printer 50 to be used for printing is selected through the operation panel 12. In step S74, the start key 12f is pushed through the operation panel 12 for transfer of the e-mail. In step S75, the reading unit 11 reads the image data. In step S76, according to the selected printer name, the printer 50 is searched among the printer names stored in the printer name storage unit 13a of the memory 13, and the print guarantee area information corresponding to the printer 50 is obtained.

In step S77, the editing unit 14 edits the image data stored in the memory 13 according to the print guarantee area information, so that the image data fits to the print guarantee area. In step S78, the PDF creation unit 15 converts the edited image data to the PDF file. In step S79, the post-edition information addition unit 15a adds the information indicating post-edition to the header portion of the PDF file. In step S80, the e-mail creation unit 16 creates the e-mail having the address and the title input through the operation panel 12, and the PDF file created in the PDF creation unit 15 as an attachment file. In step S81, the e-mail communication control unit 17 controls the transfer of the e-mail using SMPT. In step S82, the network control unit 18 sends the e-mail to the mail server 30, thereby completing the process.

Figure 27:
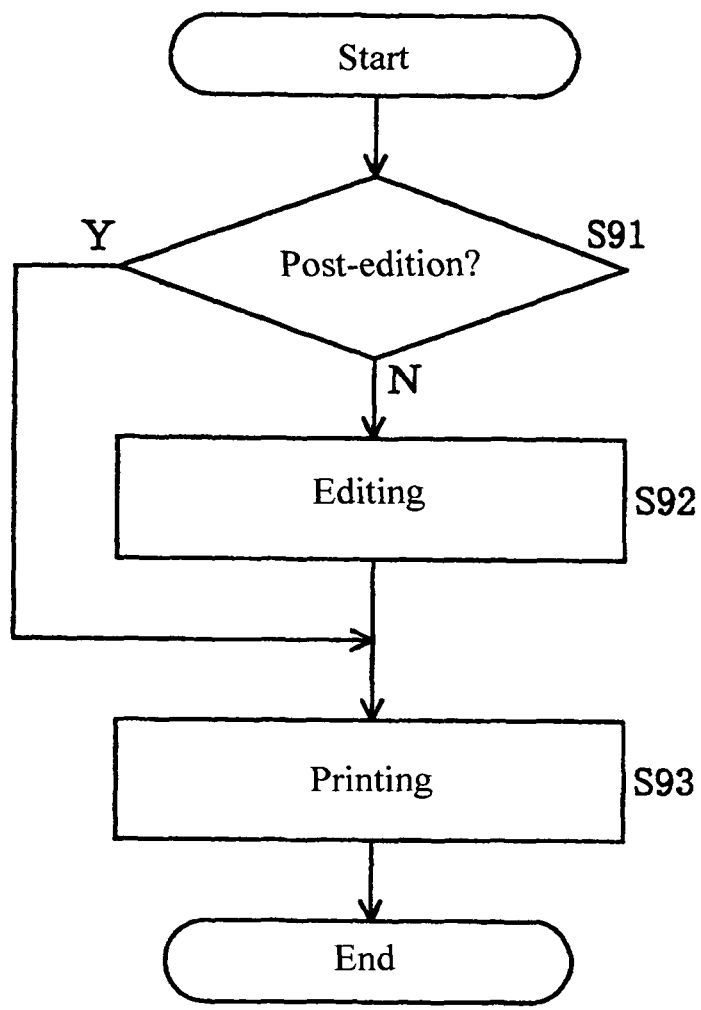
FIG. 27 is a flow chart showing an operation of a printer upon receiving a Portable Document Format (PDF) file according to the fourth embodiment of the present invention.

An operation of the printer 50 upon receiving the PDF file will be explained next. FIG. 27 is a flow chart showing the operation of the printer upon receiving the PDF file according to the fourth embodiment of the present invention.

First, the post-edition information recognition unit 55a of the emulation unit 55 analyzes the header portion of the PDF file received, and searches for the information indicating post-edition to determine whether the image data has been edited.

When the image data has been edited, that is, the information indicating port-edition is found, the emulation unit 55 does not edit the image data, and the printing unit 54 prints the image data without enlargement or reduction. When the image data has not been edited, that is, the information indicating port-edition is not found, the emulation unit 55 performs information processing to fit the image data to the print guarantee area, and the printing unit 54 prints the image data, thereby completing the process.

The flow chart shown in FIG. 27 will be explained next. In step S91, it is determined whether the image data has been edited. When the image data has been edited, the process proceeds to step S93. When the image data has not been edited, the process proceeds to step S92. In step S92, the information processing is performed to fit the image data to the print guarantee area. In step S93, the printing unit 54 prints the image data, thereby completing the process.

As described above, in the fourth embodiment, the MFP 10 as the print data generating apparatus includes the unit for adding the post-edition information to the image data edited. The printer 50 includes the unit for finding the post-edition information, and the unit for canceling the normal editing process when it is determined that the image data has been edited. Accordingly, it is possible to perform the printing operation at a high speed, thereby improving operability.

In the first to fourth embodiments, the print data generating apparatus is the MFP 10, and the invention is not limited thereto. The invention is applicable to cases in which the print data generating apparatus is a network scanner, a printer driver, or utility to be installed in a PC.

The disclosure of Japanese Patent Application No. 2005-260006, filed on Sep. 8, 2005, is incorporated in the application.

While the invention has been explained with reference to the specific embodiments of the invention, the explanation is illustrative and the invention is limited only by the appended claims.

What is claimed is:

1. A print data generating apparatus for generating print data to be sent to a printing apparatus for printing image data on a print medium, comprising:

a reading unit for reading an original to generate the image data;

an information storage unit for registering a plurality of printing apparatus and storing print guarantee area information as a print area, in which print quality is guaranteed, defined within a size of the print medium and corresponding to each of the printing apparatus;

an operation unit for selecting a printer name corresponding to the one of the printing apparatus stored in the information storage unit, and for receiving a first file name input by an operator;

an e-mail creation unit for attaching the image data read with the reading unit as an attachment file to an e-mail, and for adding the printer name selected with the operation unit to the first file name to create a second file name of the attachment file;

a printer selection unit for selecting one of the printing apparatus; and an editing unit for obtaining the print guarantee area information corresponding to the one of the printing apparatus, and editing the image data according to the print guarantee area information stored in the information storage unit, wherein said information storage unit is arranged to store the print guarantee area information according to each of a plurality of different sheet sizes.

2. The print data generating apparatus according to claim 1, further comprising an operation unit for inputting the print guarantee area information.

3. The print data generating apparatus according to claim 1, wherein said editing unit is arranged to retrieve the print guarantee area in information to be stored in the information storage unit from the printing apparatus.

4. The print data generating apparatus according to claim 1, wherein said editing unit is arranged to add post-edition information to the mage data after the editing unit edits the image data.

5. The print data generating apparatus according to claim 1, wherein said editing unit is arranged to edit the image data through editing including reduction and enlargement according to the print guarantee area information so that the image data fits to a printable area.

6. The print data generating apparatus according to claim 1, further comprising an operation unit for selecting apparatus identification information of the printing apparatus, said editing unit adding he apparatus identification information to the image data.

7. The print data generating apparatus according to claim 1, further comprising a data conversion unit for converting the image data to an image data file.

8. The print data generating apparatus according to claim 7, further comprising a communication unit for transferring the image data file to the printing apparatus.

9. The print data generating apparatus according to claim 8, wherein said communication unit is capable of sending an email having the image data file as an attachment.

10. The print data generating apparatus according to claim 1, further comprising a command control unit for sending a command requesting information of the printing apparatus so that the printing apparatus sends a response to the command, and a command analysis unit for analyzing the response.

11. The printing apparatus for printing the image data sent from the print data generating apparatus according to claim 1, wherein said printing apparatus includes a control unit for determining that the print data includes post-edition information so that the printing apparatus cancels an editing process when the print data includes post-edition information.

12. The print data generating apparatus according to claim 1, wherein said e-mail creation unit is arranged to add the printer name selected with the operation unit to a subject of the e-mail.

13. The print data generating apparatus according to claim 1, wherein said e-mail creation unit is arranged to add the printer name selected with the operation unit to a main text of the e-mail.

14. The print data generating apparatus according to claim 1, wherein said editing unit is arranged to select whether the image data is edited or not according to the print guarantee area information.

* * * * *